United States Patent
Reisch et al.

(10) Patent No.: US 12,384,230 B2
(45) Date of Patent: Aug. 12, 2025

(54) ELECTRIC DRIVE FOR A VEHICLE

(71) Applicant: ZF FRIEDRICHSHAFEN AG, Friedrichshafen (DE)

(72) Inventors: Matthias Reisch, Ravensburg (DE); Jürgen Wafzig, Bermatingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 98 days.

(21) Appl. No.: 17/864,728

(22) Filed: Jul. 14, 2022

(65) Prior Publication Data
US 2023/0022088 A1   Jan. 26, 2023

(30) Foreign Application Priority Data
Jul. 26, 2021   (DE) ..................... 10 2021 208 036.7

(51) Int. Cl.
*B60K 1/00* (2006.01)
*B60K 17/08* (2006.01)
*B60K 17/16* (2006.01)

(52) U.S. Cl.
CPC ................ *B60K 1/00* (2013.01); *B60K 17/08* (2013.01); *B60K 17/16* (2013.01); *B60K 2001/001* (2013.01)

(58) Field of Classification Search
CPC .......... B60K 1/00; B60K 17/08; B60K 17/16; B60K 2001/001
See application file for complete search history.

(56) References Cited

U.S. PATENT DOCUMENTS

| | | | |
|---|---|---|---|
| 5,620,387 A * | 4/1997 | Janiszewski | B60K 1/00 475/207 |
| 8,499,868 B2 * | 8/2013 | Fuechtner | B60K 1/00 180/65.7 |
| 9,638,302 B2 * | 5/2017 | Smetana | B60K 1/02 |
| 11,186,162 B2 * | 11/2021 | Schwekutsch | B60K 6/48 |
| 11,739,822 B2 * | 8/2023 | Beck | F16H 48/06 475/150 |
| 11,815,179 B2 * | 11/2023 | Park | F16H 63/32 |

FOREIGN PATENT DOCUMENTS

| | | |
|---|---|---|
| DE | 102010036884 | 2/2012 |
| DE | 102019205750 | 10/2020 |
| KR | 20090127493 A * | 12/2009 |

OTHER PUBLICATIONS

Office Action for corresponding German Patent Application No. 10 2021 208 036.7.
B. Paul, "Kinematics and Dynamics of Planar Machinery", Prentice Hall, pp. 83-90, 1979.

* cited by examiner

*Primary Examiner* — William C Joyce
(74) *Attorney, Agent, or Firm* — COZEN O'CONNOR

(57) ABSTRACT

An electric drive for a vehicle and a vehicle is having at least one electric machine having a rotor shaft and a planetary transmission for dividing the torque introduced via the rotor shaft to a first output shaft and a second output shaft, wherein for decoupling the rotor shaft at least one switching element is provided relative to the torque transmission between the rotor shaft and an element of the planetary transmission.

18 Claims, 4 Drawing Sheets

ELECTRIC DRIVE FOR A VEHICLE

BACKGROUND OF INVENTION

1. Field of the Invention

The present disclosure relates to an electric drive for a vehicle, comprising at least one electric machine.

2. Description of Related Art

A transmission having an input shaft, a first output shaft and a second output shaft, as well as a first planetary gear set and a second planetary gear set connected to the first planetary gear set is provided in publication DE 10 2019 205 750 A1, wherein the planetary gear sets comprise in each case a plurality of elements connected such that a torque introduced via the input shaft is converted and distributed to the two output shafts in a defined ratio, such that a sum torque is prevented from being produced. Accordingly, in addition to the gear ratio provided, an integral differential function is produced in the known transmission without an additional output differential being required.

SUMMARY OF THE INVENTION

One aspect of the present invention is an electric drive or a vehicle having the drive, in which in the case of an integral differential function a decoupling of the electric machine from the output shafts is made possible.

Thus an electric drive for a vehicle is proposed, comprising at least one electric machine having a rotor shaft and having a planetary transmission for dividing the torque introduced via the rotor shaft to a first output shaft and a second output shaft. In order to ensure a decoupling of the electric machine or a so-called disconnect function, it is provided that at least one switching element or the like, or a separating point, is provided relative to the torque transmission between the rotor shaft and an element of the planetary transmission.

Since a switching element is provided as a separating point between the electric machine and an input element of the planetary transmission, for example during passive operation when the electric machine does not transmit any torque, the drag torque may be reduced and the efficiency improved thereby. Additionally, when the drive is implemented on a different drive axle, greater speeds of the vehicle may be produced thereby.

In the proposed electric drive, the switching element may be arranged relative to the power flux on the rotor shaft side, i.e. between the planetary transmission and the electric machine. If, for example, the rotor shaft is directly connected to the planetary transmission, the switching element might be provided as the separating point between the rotor shaft and the input of the planetary transmission. However, it is also conceivable that the rotor shaft is indirectly connected, i.e. via a further component, to an element of the planetary transmission. In this case, via the switching element the rotor shaft may be connected fixedly in terms of rotation to a pinion shaft or the like, which is connected to an element of the planetary transmission, or decoupled in the open state of the switching element.

Different possibilities for arranging the rotor shaft and pinion shaft are conceivable. An arrangement which, in particular, saves installation space is achieved by the rotor shaft and the pinion shaft being arranged coaxially to one another, wherein preferably the pinion shaft, when viewed radially, is mounted at least in some portions inside the rotor shaft. Different bearing options between the pinion shaft and the rotor shaft are conceivable. A bearing arrangement which is particularly advantageous in terms of installation space and which is cost-effective is implemented by a needle bearing arrangement. In order to implement a particularly cost-effective axial bearing arrangement between the pinion shaft and the rotor shaft, an axial plain bearing may be used since a stationary operating state, in which the plain bearing is subjected at the same time to axial force and differential speed, is not present.

Preferably, a positive switching claw element or the like may be provided with an axially displaceable sliding sleeve as the switching element. The use of a positively connected switching element has the advantage that firstly a small drag torque occurs and secondly small activation forces are required. Moreover, positively connected switching elements are more cost-effective relative to frictionally connected switching elements.

The sliding sleeve of the claw switching element is axially movable such that in the switched state the rotor shaft and the pinion shaft are connected to one another fixedly in terms of rotation via the sliding sleeve. To this end, for example, an external toothing of the sliding sleeve may be axially moved in an internal toothing as the sliding toothing of the rotor shaft, in such a manner until an internal toothing of the sliding sleeve is brought into engagement with an external toothing as the switching toothing of the pinion shaft in the switched state. In principle, it is possible that the arrangement of the switching and sliding toothing on the rotor shaft and the pinion shaft may also be exchanged. Moreover, it is possible that the switching toothing and sliding toothing on the rotor shaft or the pinion shaft are designed in multiple pieces or in one piece.

Independently of the respective embodiment of the sliding sleeve it is provided that the sliding sleeve is arranged coaxially to the rotor shaft. As a result, a marked advantage in terms of installation space is provided. Regarding the arrangement position of the sliding sleeve, the sliding sleeve may be arranged radially inside the electric machine, in order to implement in this manner a radially nested design of the electric machine and switching element and thereby to save installation space. It is also possible to arrange the sliding sleeve, when viewed axially, between the planetary transmission and the electric machine, whereby the bearing arrangement of the rotor shaft may be implemented in a simple manner.

In principle, it is possible to use an actuator which is electromechanical, hydraulic, pneumatic or the like, for actuating the switching element. With the use of an electromechanical actuator, a switching fork coupled to the switching element may preferably be moved via an electrically driven spindle drive.

Preferably in the proposed electric drive, the rotor shaft, the planetary transmission and the output shafts may be arranged coaxially to one another in order to implement a particularly radially compact design thereby.

In order to implement the integral differential function in the proposed electric drive by the planetary transmission, and thereby to save an additional output differential, a first planetary gear set and a second planetary gear set coupled to the first planetary gear set may be provided as the planetary transmission. The two planetary gear sets may preferably be radially nested in one another in order to save, for example, axial installation space. The planetary gear sets, however, may also be arranged axially adjacent to one another in order to save radial installation space thereby. It is also conceivable that the planetary gear sets are designed as minus-planetary gear sets and/or as plus-planetary gear sets.

Regarding the nesting of the two planetary gear sets, it is preferably provided that a first element of the first planetary gear set is connected to the pinion shaft, that a second element of the first planetary gear set is connected to a first output shaft, that a third element of the first planetary gear set is connected to a first element of the second planetary gear set, that a second element of the second planetary gear set is connected to the housing and that a third element of the second planetary gear set is connected to the second output shaft. In this preferred arrangement, it is advantageously possible that, for example, the first element, for example as the sun gear of the first planetary gear set, together with the pinion shaft form a common component, by a running toothing for the sun gear being provided on the pinion shaft. Moreover, it is possible that the third element of the first planetary gear set, for example as a ring gear, and the first element of the second planetary gear set, for example as sun gear, also form a common component with an internal and external toothing.

If the two planetary gear sets are designed as minus-planetary gear sets, the first element may be designed as the sun gear, the second element as the planetary gear carrier and the third element as the ring gear.

A minus-planetary gear set has planetary gears that are rotatably mounted on the planetary gear carrier thereof and mesh with the sun gear and the ring gear of this planetary gear set such that, when the planetary gear carrier is stationary and the sun gear rotates, the ring gear rotates in the direction opposing the rotational direction of the sun gear. A plus-planetary gear set, however, has internal and external planetary gears rotatably mounted on the planetary gear carrier thereof and in meshing engagement with one another, wherein the sun gear of this planetary gear set meshes with the internal planetary gears and the ring gear of this planetary gear set meshes with the external planetary gears such that, when the planetary gear carrier is stationary and the sun gear rotates, the ring gear rotates in the same rotational direction as the rotational direction of the sun gear. A minus-planetary gear set may preferably be transferred into a plus-planetary gear set if the planetary gear carrier and the ring gear connection on this gear set are exchanged with one another and the value of the stationary gear ratio is increased by 1.

One aspect of the present invention is also achieved by a vehicle having at least one electric drive as described above. The drive may also be designed as an axle drive. Electric axle drives of vehicles are occasionally used in combination with a further driven axle. This further axle may be driven, for example, by an internal combustion engine, by hybrid, or also electrically. If, for example, the vehicle is intended to be driven only via this further axle, as already described, the proposed electric drive may be decoupled.

BRIEF DESCRIPTION OF THE DRAWINGS

The present invention is described in more detail hereinafter with reference to the drawings, in which.

DETAILED DESCRIPTION OF THE PRESENTLY PREFERRED EMBODIMENTS

Figure 1:
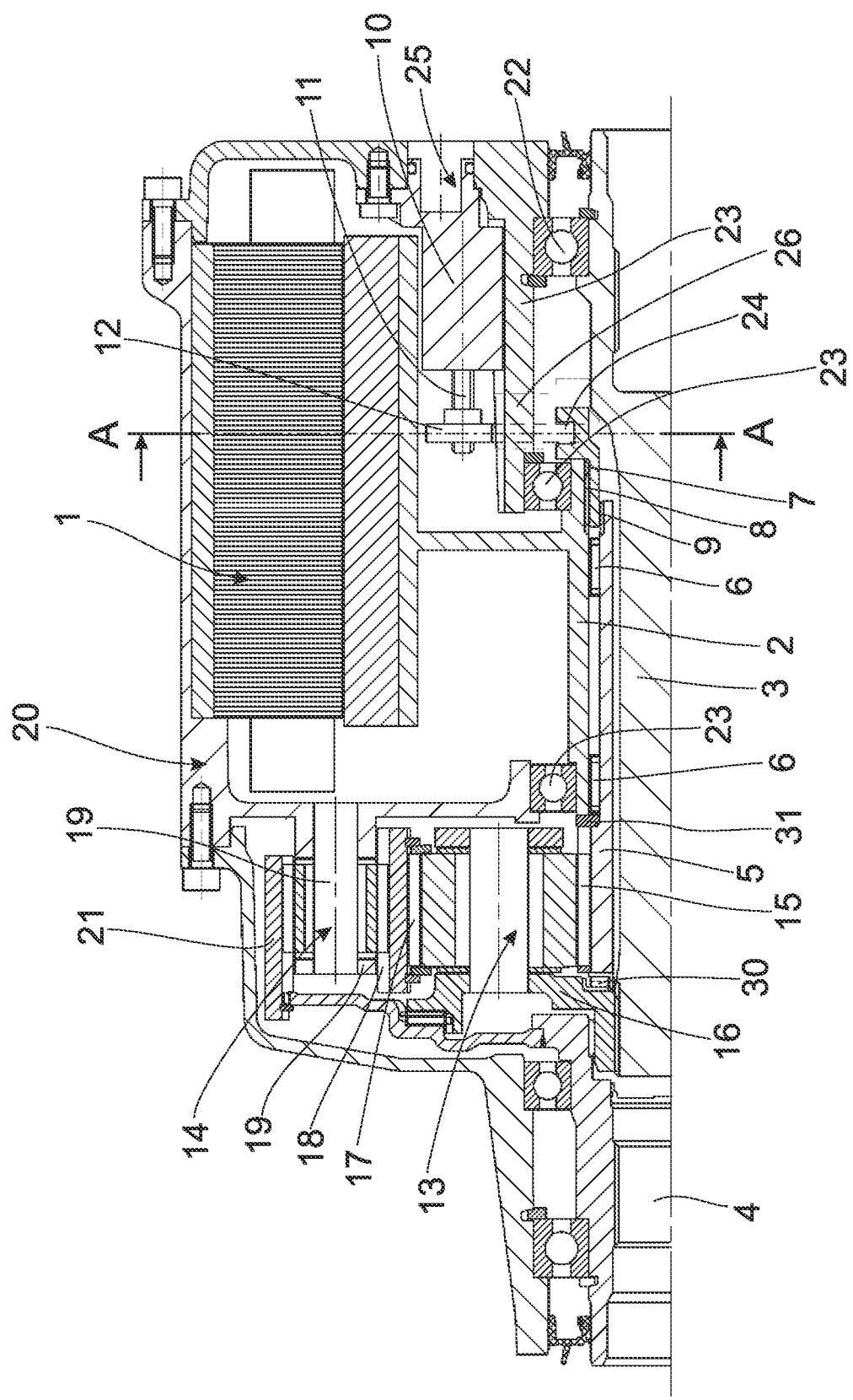
FIG. 1 is a schematic sectional view of an electric drive for a vehicle.

Different variants of an electric drive according to the invention for a vehicle are shown by way of example in FIGS. 1 to 4.

Independently of the respective variants, the electric drive comprises an electric machine 1 having a rotor shaft 2 and having a planetary transmission for dividing the torque introduced via the rotor shaft 2 to a first output shaft 3 and a second output shaft 4. In order to decouple the rotor shaft 2 from the planetary transmission or from the output shafts 3, 4, it is provided that a switching element is provided relative to the torque transmission between the rotor shaft 2 and an element of the planetary transmission.

In this manner, for example in passive operation of the electric machine 1 when this electric machine does not transmit any torque, the rotor shaft 2 and thus the electric machine 1 may be decoupled from the planetary transmission or from the output shafts 3, 4.

Depending on the switching position, via the switching element the rotor shaft 2 is couplable fixedly in terms of rotation or decouplable relative to a pinion shaft 5 which is connected to an element of the planetary transmission. The pinion shaft 5 and the rotor shaft 2 are arranged coaxially to one another, wherein the pinon shaft 5, when viewed radially, is mounted at least in some portions inside the rotor shaft 2 via needle bearings 6.

A positive switching claw element with an axially displaceable sliding sleeve 7 is provided as the switching element. The sliding sleeve 7 is axially movable such that in the switched state of the sliding sleeve 7 the rotor shaft 2 and the pinion shaft 5 are connected to one another fixedly in terms of rotation. The sliding sleeve 7 and the rotor shaft 2 and the pinion shaft 5 are arranged coaxially to one another.

The switching element is actuated via an electromechanical actuator that has a spindle drive 11 driven by an electric motor 10, wherein the spindle drive 11 axially moves a switching fork 12 coupled to the sliding sleeve 7, in order to move the sliding sleeve 7 between the switching positions, "couple" or "connect" and "decouple" or "disconnect".

The rotor shaft 2 and the planetary transmission and the output shafts 3, 4 are arranged coaxially to one another. A first planetary gear set 13 and a second planetary gear set 14 coupled to the first planetary gear set 13 are provided as the planetary transmission. By interconnecting the two planetary gear sets 13, 14 the torque applied by the rotor shaft 2 is divided to the two output shafts 3, 4, so that an output differential may be dispensed with.

To this end, for example, two minus-planetary gear sets 13, 14 which are radially nested in one another may be provided. One or two plus-planetary gear sets may be also provided instead of the minus-planetary gear sets.

In the variants shown, preferably minus-planetary gear sets are provided as the planetary gear sets 13, 14. In this case, it is provided that as the first element of the first planetary gear set 13, a sun gear 15 is connected to the pinion shaft 5, wherein the sun gear 15 and pinion shaft 5 are designed as a common component, in which a running toothing of the sun gear 15 is provided on the pinion shaft 5. As the second element of the first planetary gear set 13, a planetary gear carrier 16 is connected to the first output shaft 3. As the third element of the first planetary gear set 13, a ring gear 17 is connected to a sun gear 18 as the first element of the second planetary gear set 14, wherein the ring gear 17 and the sun gear 18 are formed by a common component with an internal and external toothing. Moreover, as the second element of the second planetary gear set 14, a planetary gear carrier 19 is connected to a housing 20 of the electric drive. Finally, as the third element of the second planetary gear set 14, a ring gear 21 is connected to the second output shaft 4.

Figure 2:
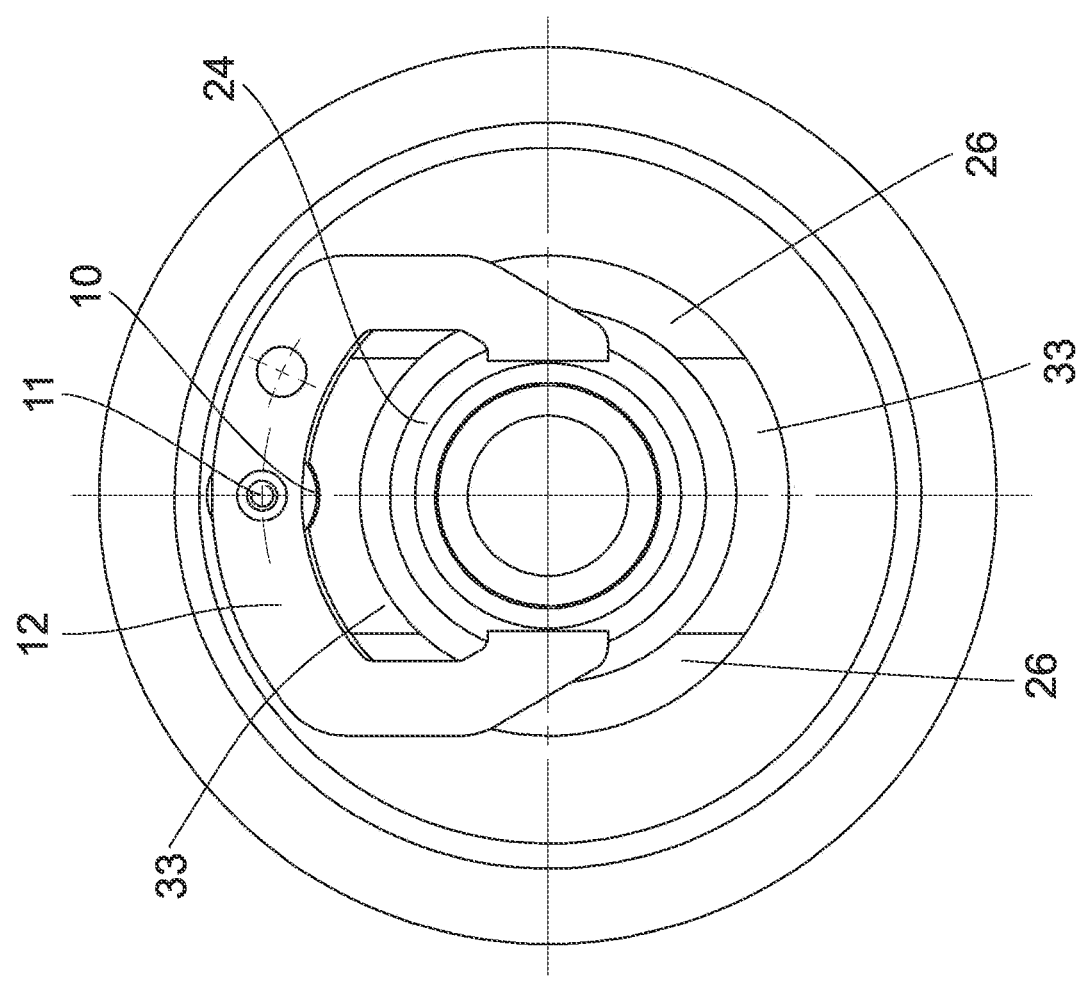
FIG. 2 is a schematic sectional view of the electric drive along the cutting line A-A according to FIG. 1.

A first variant is shown in FIGS. 1 and 2, in which a first possible position is provided for arranging the sliding sleeve 7 radially inside the electric machine 1, wherein the sliding sleeve 7 together with the switching fork 12, when viewed axially, are located between a bearing 22 of the first output shaft 3 and bearings 23 of the rotor shaft 2. The sliding sleeve 7 is axially movable via an external toothing in an internal toothing as the sliding toothing 8 of the rotor shaft 2, such that an internal toothing of the sliding sleeve 7 may be brought into engagement with an external toothing as the switching toothing 9 of the pinion shaft 5 in the switched state. In the switched state which is shown in FIG. 1, the axially movable sliding sleeve 7 connects the rotor shaft 2 fixedly in terms of rotation to the pinion shaft 5 mounted in the interior. To this end, the axially movable switching fork 12, which is driven by the electric motor 10 via the spindle drive 11, is located in a groove 24 of the sliding sleeve 7 in order to move this sliding sleeve correspondingly axially. The electric motor 10 is designed in one piece with a plug connector and arranged in the region of the housing lead-through 25 and seals this housing lead-through such that an escape of oil from the housing 20 is prevented.

The pinion shaft 5 is axially mounted between an axial needle bearing 30 supported on the planetary gear carrier 16 of the first planetary gear set 13, and an axial plain bearing 31 supported on the rotor shaft 2. The advantage of the use of an axial plain bearing 31 between the pinion shaft 5 and the rotor shaft 2 is a cost-saving. This is made possible since a stationary operating state, in which differential speed and axial force are applied at the same time to the axial plain bearing 31, is not present.

FIG. 2 shows a sectional view along the cutting line A-A according to FIG. 1, it being visible therefrom that a groove 26 is provided on either side in a component 33 of the housing 20 through which the switching fork 12 engages on either side in order to actuate the sliding sleeve 7.

Figure 3:
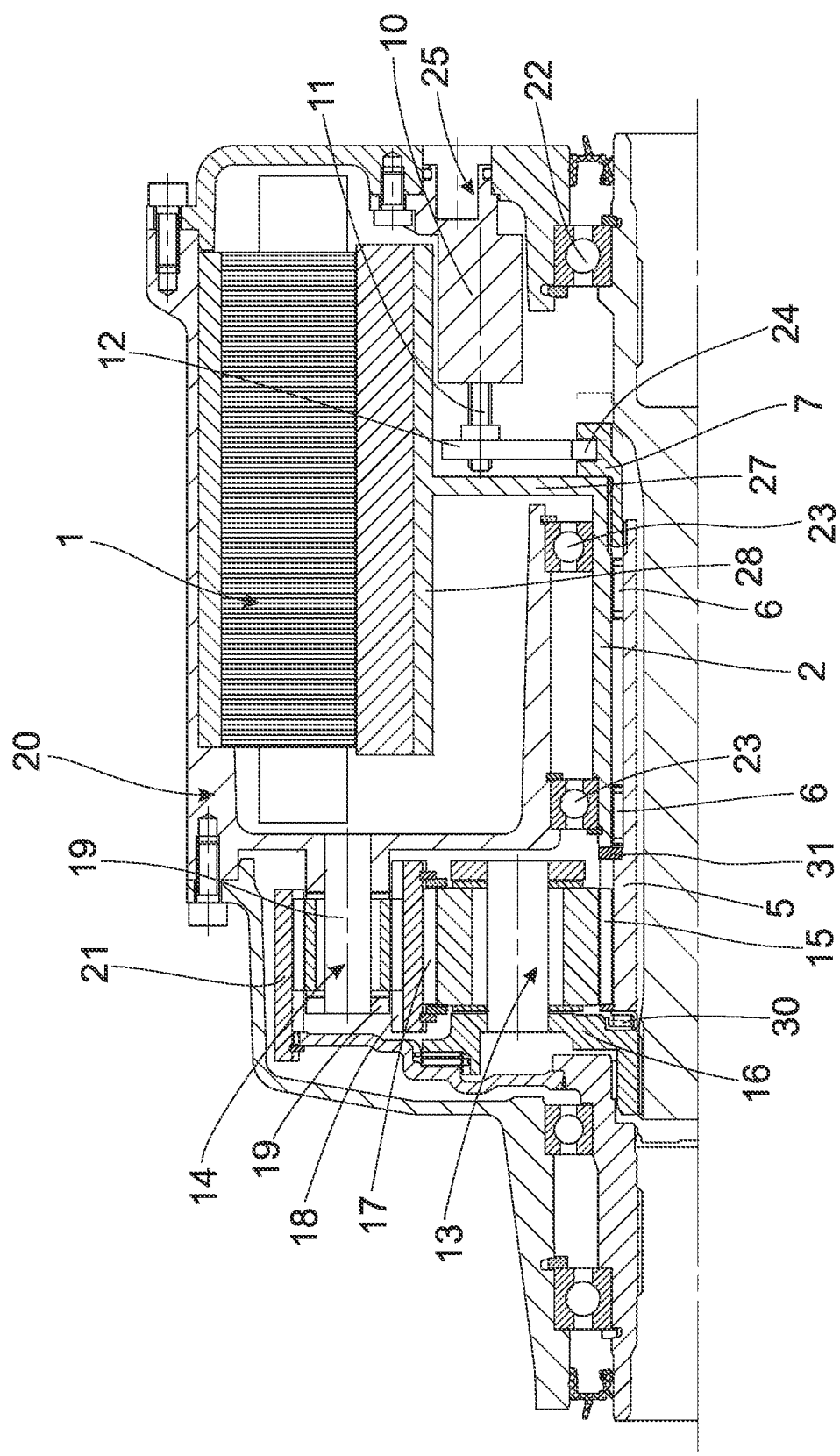
FIG. 3 is a schematic sectional view of the electric drive.

A second variant of the electric drive is shown in FIG. 3, which differs from the first variant only in that a one-sided bearing arrangement of the rotor shaft 2 is provided, in which the two bearings 23 of the rotor shaft 2 are provided on only one side relative to a connecting portion 27 between a rotor carrier 28 and the rotor shaft 2. As a result, an otherwise required housing lead-through of the switching fork 12 and the grooves 26 required therefor are advantageously not required in the component 33 of the housing 20. Production costs may be saved thereby.

Figure 4:
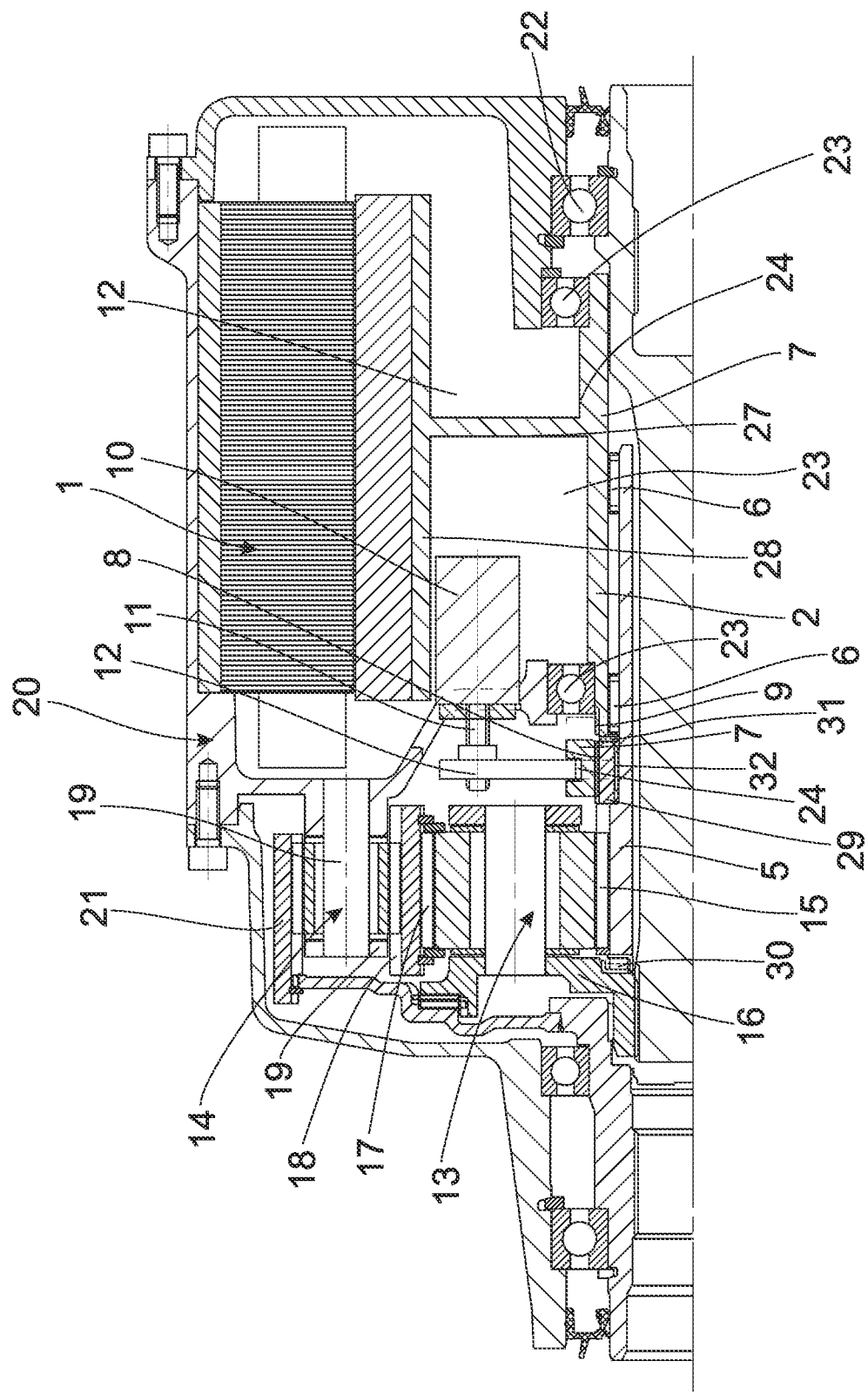
FIG. 4 is a schematic sectional view of the electric drive.

A third variant of the electric drive is shown in FIG. 4, in which in contrast to the first and second variant the sliding sleeve 7, when viewed axially, is arranged between the planetary gear sets 13, 14, on the one hand, and the electric machine 1, on the other hand.

In the third variant according to FIG. 4, a rotor bearing arrangement is possible once again on either side relative to the connecting portion 27 between the rotor carrier 28 and the rotor shaft 2, as in the first variant according to FIG. 1, but without the switching fork 12 having to engage through the housing in a complex manner, since the sliding sleeve 7, when viewed axially, is arranged between the planetary gear sets 13, 14 and the electric machine 1.

A coaxially arranged spacer ring 29 is provided on the pinion shaft 5. This spacer ring permits a particularly simple manufacture of the running toothing of the sun gear 15 of the first planetary gear set 13 on the pinion shaft 5 as a common component. Depending on the design, the spacer ring 29 may also be dispensed with and the sliding sleeve 7 directly arranged on the sliding toothing 8. If, however, the spacer ring 29 is provided, the axial plain bearing 31 is located on the side of the spacer ring 29 facing the rotor shaft 2. A driving toothing 32 is located on the radially internal side of the spacer ring 29 for transmitting the torque between the pinion shaft 5 and the spacer ring 29. The sliding toothing 8 on which the sliding sleeve 7 is axially movable is located on the radially external side of the spacer ring 29. The switching toothing 9 is located on the rotor shaft 2. This means that the toothing on the radially internal side of the sliding sleeve 7 at least in the left-hand region has the function of a sliding toothing 8 and in the right-hand region the function of a switching toothing 9. It is also possible for the sliding toothing 8 and the switching toothing 9 to be exchanged. This has the advantage that when the stationary rotor shaft 2 is decoupled, no frictional losses are produced on the switching fork 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. An electric drive for a vehicle, comprising:
at least one electric machine having a rotor shaft;
a first output shaft;
a second output shaft;
a planetary transmission configured to divide a torque introduced via the rotor shaft to the first output shaft and the second output shaft comprising:
a first planetary gear set; and
a second planetary gear set coupled to the first planetary gear set,
wherein:
a first element of the first planetary gear set is connectable or connected to the rotor shaft,
a second element of the first planetary gear set is connected to the first output shaft,
a third element of the first planetary gear set is connected to a first element of the second planetary gear set,
a second element of the second planetary gear set is connected to a housing, and
a third element of the second planetary gear set is connected to the second output shaft; and at least one switching element configured to decouple the rotor shaft is provided relative to torque transmission between the rotor shaft and the first element of the first planetary gear set of the planetary transmission.

2. The electric drive according to claim 1, wherein the rotor shaft is couplable fixedly in terms of rotation or decouplable relative to a pinion shaft of the planetary transmission via the at least one switching element.

3. The electric drive according to claim 2, wherein the pinion shaft, when viewed radially, is mounted, at least in part, inside the rotor shaft.

4. The electric drive according to claim 2, wherein the at least one switching element is a positive switching claw element with a sliding sleeve that is axially displaceable.

5. The electric drive according to claim 4, wherein the sliding sleeve is axially movable such that in a closed state of the sliding sleeve the rotor shaft and the pinion shaft are connected to one another fixedly in terms of rotation.

6. The electric drive according to claim 4, wherein the sliding sleeve, the rotor shaft, and the pinion shaft are arranged coaxially to one another.

7. The electric drive according to claim 4, wherein the sliding sleeve, when viewed radially, is arranged inside the at least one electric machine.

8. The electric drive according to claim 4, wherein the sliding sleeve, when viewed axially, is arranged between the planetary transmission and the at least one electric machine.

9. A vehicle comprising:
at least one electric drive comprising:
at least one electric machine having a rotor shaft;
a first output shaft;
a second output shaft;
a planetary transmission configured to divide a torque introduced via the rotor shaft to the first output shaft and the second output shaft;
at least one switching element configured to decouple the rotor shaft is provided relative to a transmission of torque between the rotor shaft and an element of the planetary transmission;
an actuator arranged at least partially within the electric machine and configured to actuate the at least one switching element; and
a switching fork arranged at least partially within the electric machine, the switching fork being axially driven by the actuator and coupled to the at least one switching element.

10. The electric drive according to claim 1, wherein the at least one switching element is actuatable via an actuator that is electromechanical, hydraulic, or pneumatic.

11. The electric drive according to claim 10, wherein the actuator is an electromechanical actuator having a spindle drive which is driven via an electric motor and configured to axially move a switching fork coupled to the at least one switching element.

12. The electric drive according to claim 11, wherein the switching fork is arranged in a groove in a housing to which an element of the planetary gear set is connected.

13. The electric drive according to claim 1, wherein the rotor shaft, the planetary transmission, the first output shaft, and the second output shaft are arranged coaxially to one another.

14. The electric drive according to claim 1, wherein an axial plain bearing is arranged on the rotor shaft and configured to support axial forces of a pinion shaft of the planetary transmission.

15. The electric drive according to claim 14, wherein the axial plain bearing is arranged on a side of a spacer ring facing the rotor shaft.

16. The electric drive according to claim 1, wherein two bearings of the rotor shaft are provided on only one side relative to a connecting portion between a rotor carrier and the rotor shaft.

17. The electric drive according to claim 4, further comprising a sliding toothing located on a radially external side of a spacer ring on which the sliding sleeve is axially movable.

18. An electric drive for a vehicle, comprising:
at least one electric machine having a rotor shaft;
a first output shaft;
a second output shaft;
a planetary transmission configured to divide a torque introduced via the rotor shaft to the first output shaft and the second output shaft;
at least one switching element configured to decouple the rotor shaft is provided relative to torque transmission between the rotor shaft and an element of the planetary transmission;
an actuator arranged at least partially within the electric machine and configured to actuate the at least one switching element; and
a switching fork arranged at least partially within the electric machine and is axially driven by the actuator and coupled to the at least one switching element.

* * * * *